Patented Nov. 19, 1929

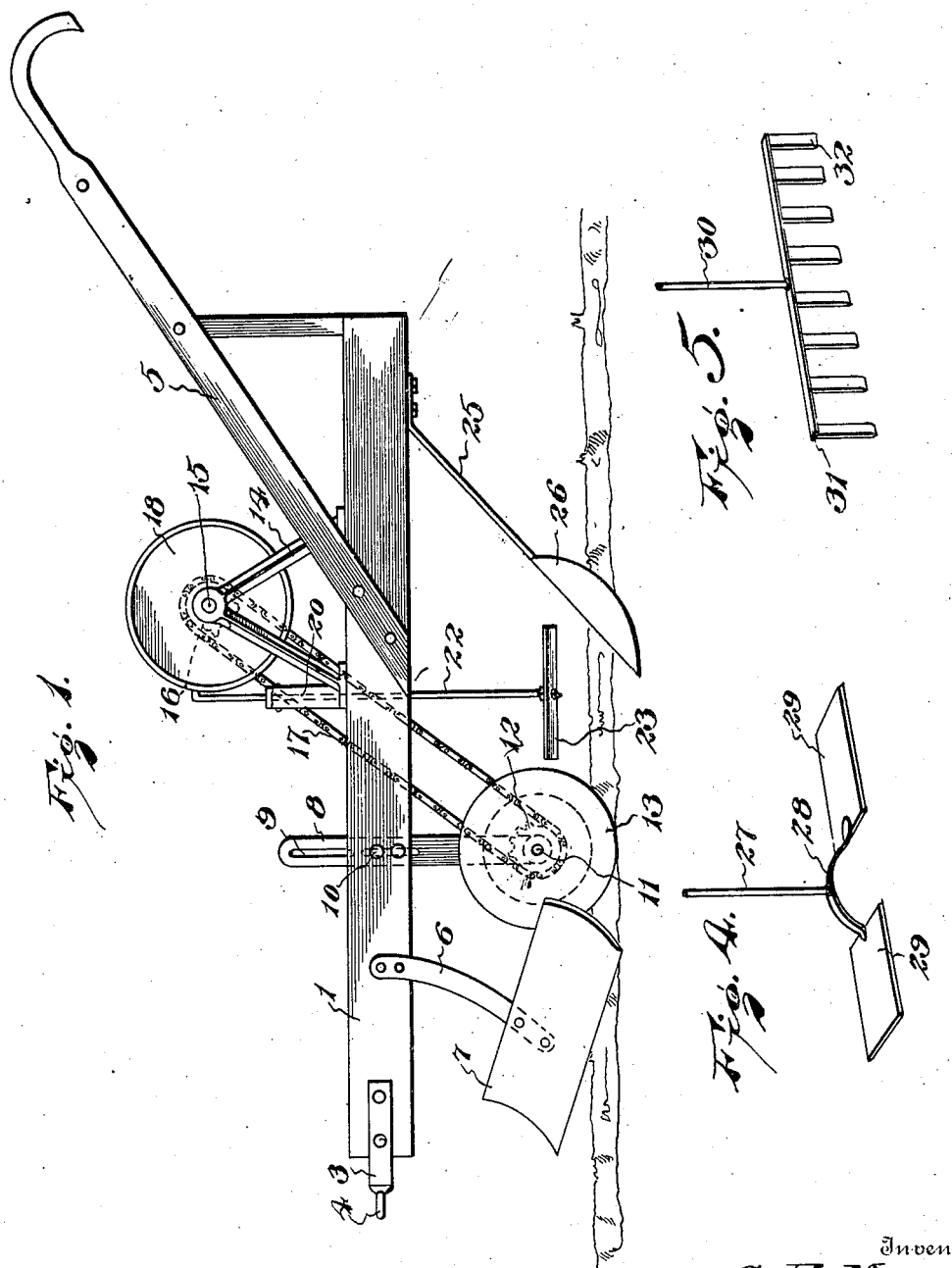

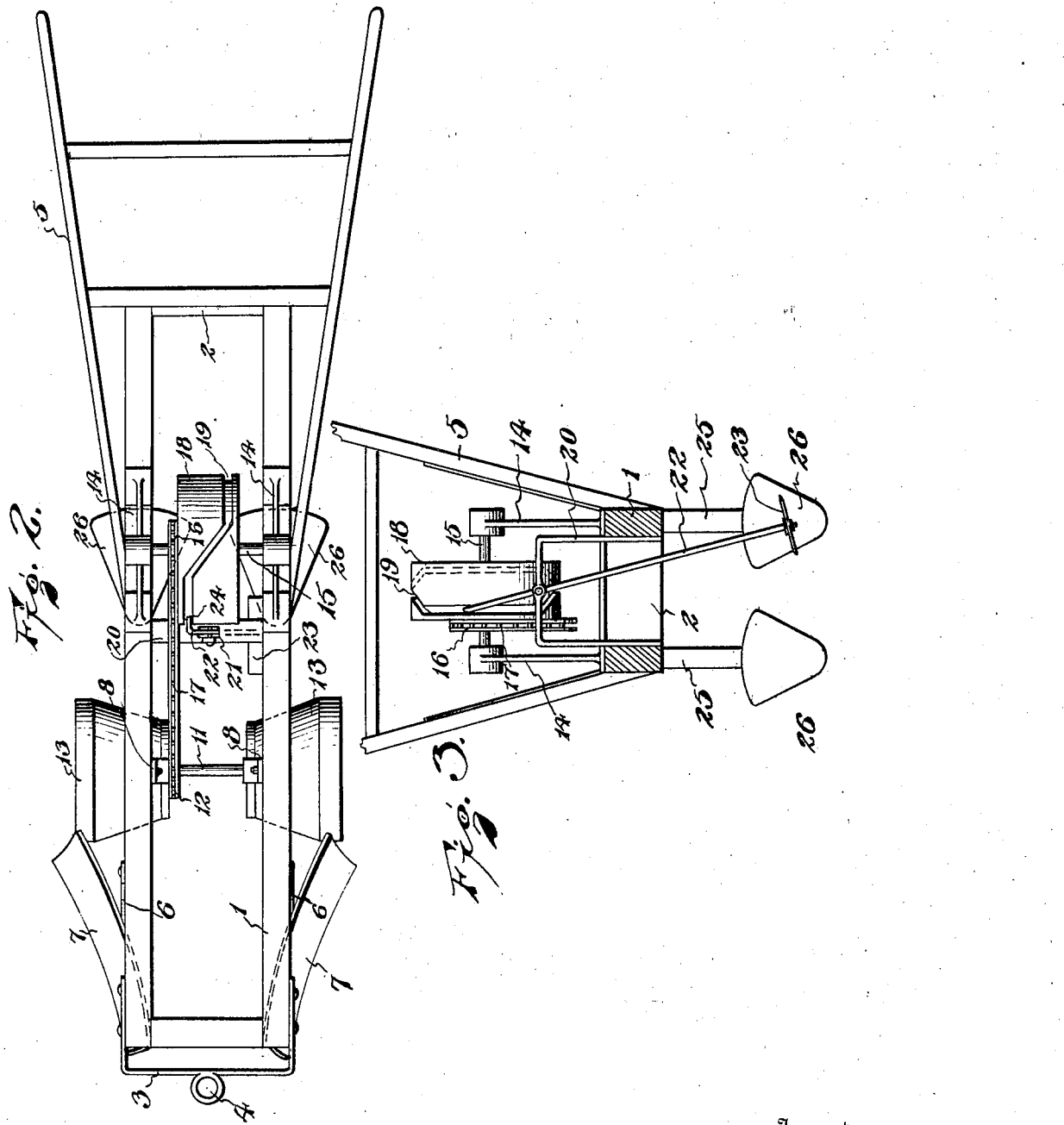

1,736,127

UNITED STATES PATENT OFFICE

CHARLES E. MORRIS, OF LITTLE ROCK, ARKANSAS

COTTON CHOPPER

Application filed October 19, 1927. Serial No. 227,280.

This invention has for its object the provision of a cotton chopper by the use of which the standing cotton will be cut away at regular intervals so that a proper growth of the remaining plants may occur, the machine being so arranged as to run on the ridge or row of young plants to scrape the sides of the ridge evenly and operate a cutter from elements rolling on the scraped sides of the ridge so that the cutter will operate at a uniform height from end to end of the row. The invention also has for its object the provision of a machine which will be simple in construction and efficient in operation. The invention is illustrated in the accompanying drawings and consists in certain novel features which will be particularly pointed out in the appended claim.

In the drawings:

Figure 1 is a side elevation of one embodiment of the invention;

Fig. 2 is a plan view of the same;

Fig. 3 is a vertical transverse section taken just in advance of the cutter or hoe, and Figs. 4 and 5 are detail perspective views showing various forms of hoes.

In the drawings, the reference numeral 1 indicates a main frame which may be of any suitable construction and is illustrated as consisting of side bars connected at their rear ends by a cross bar 2 and at their front ends by a bail 3 having an eye or ring 4 at its center whereby it may be connected to a tractor or to a draft animal or be connected to an ordinary wheeled cultivator so as to run between the wheels of the cultivator. To the sides of the main frame are secured handles 5 of well known form whereby the machine may be steered by an attendant walking at the rear of the same. Near the front ends of the side bars, I secure thereto hangers 6 carrying scrapers 7 at their lower ends, the scrapers being disposed so as to converge upwardly and forwardly and being thereby adapted to run along the ridge and scrape the sides of the same to a smooth surface having a uniform inclination downwardly and outwardly from its apex along which the plants are growing. At the rear of the hangers 6, standards 8 are provided, and these standards are constructed with slots 9 through which fastening bolts 10 may be inserted to adjustably secure the standards to the side bars of the main frame. In the lower ends of these standards is rotatably mounted a shaft 11 which extends through the standards and upon which at the inner side of one standard is secured a sprocket pinion 12 for a purpose which will presently appear. Upon the ends of the shaft 11 are secured tapered rollers 13 having their smaller ends disposed inwardly so that these rollers will run along the sides of the ridge immediately in rear of the scrapers 7 and will tend to compress the soil about the roots of the plants and also transmit rotation to the shaft to actuate the pinion 12. At the rear of the standards 9, bearing brackets or standards 14 are secured upon the side bars of the main frame and rotatably mounted in the upper ends of these brackets or standards is a shaft 15 provided near one end with a sprocket gear 16, about which and the sprocket pinion 12 a chain 17 is trained. Between the standards 14, a cam wheel 18 is secured to the shaft 15 and in the circumferential surface of this wheel is formed a cam groove 19, as shown. Immediately in advance of the cam wheel 18, an arched bracket 20 is secured transversely upon the main frame and in the top of this arch at the center of the same is formed a slot 21 through which the shank 22 of the hoe 23 passes, the shank being pivotally secured to the arch within said slot, as will be understood. At the upper end of the shank 22 is a lug or pin 24 which enters the cam groove 19 and is swung from side to side at regular intervals by said groove so that the hoe blade 23 will be swung across the row of plants and cut through the same. The blade 23 shown in Figs. 1, 2 and 3 is a flat continuous member having both longitudinal edges sharpened and the shank 22 is secured to said blade at the center of the same. The cam groove, through a portion of its length, is disposed parallel with the ends of the wheel or disk 18 and at opposite sides of the central radial plane of the latter, the parallel portions of the groove being connected by diagonally disposed portions, as clearly shown in Figs. 2 and 3 and as will be understood. As the machine travels along the row of plants, the tapered rollers 13 will be rotated through their tractive engagement with the surface of the earth and their rotation will be imparted through the sprocket gearing to the shaft 15 and the cam member 18. As a result of the rotation of the cam, the hoe will be swung from side to side at regular intervals and will be held at the side toward which it swings through an intermediate interval so that it will cut through the plants first in one direction and then in the opposite direction and between its two movements will be held beyond the plants so as to be free of the same.

Secured to the rear end portion of the main frame are hangers or standards 25 carrying plows 26 at their lower ends, and these plows may be in any preferred form, such as ordinary shovel plows or well-known cultivator disks.

The operation of the machine will, it is thought, be readily understood from what has been said. The machine is drawn along the row of plants so that the scrapers 7 will first act at the sides of the ridge to reduce irregularities and impart a smooth continuous surface of uniform height to the ridge. The tapered rollers following immediately behind the scrapers will ride on the sides of the ridge and will transmit motion through the cooperating parts to the hoe so that the hoe will be oscillated at regular intervals to cut out plants, and the plows throw loose dirt to the young plants left standing. Inasmuch as the sides of the ridge have been reduced to a uniform level by the scrapers, the rollers will not be subjected to vertical movement and the hoe consequently will operate at a uniform height so that it will always cut through the plants instead of digging into the dirt on some strokes and swinging clear of the plants on other strokes, as is frequently the case with cotton choppers as ordinarily built. It will be noted that the weight of the machine rests on the tapered rollers so that the rollers will not be easily lifted by pebbles or other small obstructions which they may encounter, and the scrapers will turn some of the soil cut off by them into the depressions in the sides of the ridges so that there will be no ruts left into which the rollers may drop. The vertical adjustability of the standards which carry the rollers permits the user of the machine to properly set the rollers so that the hoe will be brought into action at the proper height above the ridge. This adjustability also facilitates the compensation for wear upon the parts.

The hoe illustrated in Figs. 1, 2 and 3 is designed to make a single cut at each stroke and is ordinarily about ten inches long so that at each stroke it will cut a swath of ten inches. The cam groove is so proportioned that the travel of the machine will leave a space of ten inches between cuts and the plants will be left standing at ten inch intervals and in groups or bunches extending through a similar distance. As the growth of the plants progresses, they may be further thinned as may be considered advisable. In Fig. 4, the hoe is shown as comprising a shank 27 having an arched bracket 28 at its lower end and to the ends of the bracket are secured blades 29, the spread of the bracket being two inches and the length of each blade being four inches so that this hoe will leave plants standing at intervals of four inches and will make two cuts at each stroke, the travel of the machine between the strokes being the same as in the form first described. This form of hoe may be preferred when the initial thinning of the plants is performed while they are very young, and it will be understood that various forms of hoes will be supplied with the machine so that the user may employ whichever hoe seems to him most desirable under any given circumstances. In Fig. 5, I have illustrated a hoe especially adapted for use when the plants are just beginning to sprout and which will operate to cut out grass and vines which may be present and which may tend to choke the cotton plants if not removed. This hoe consists of a shank 30 which may be of the same form as the shank 22 and has a longitudinally extending bar 31 secured to its lower end. Depending from said longitudinal bar and spaced equi-distantly along the same are a series of narrow knives or blades 32 having their ends sharpened. This hoe will remove very young plants and at the same time will engage vines and grass which may be growing between and around the plants and will drag or rake such undesirable growths from the ridge so that the plants left standing will be free to develop. The upper end of the shank of each hoe is constructed to engage the cam groove 19, as will be understood.

Having thus described the invention, I claim:

A cotton chopper comprising a frame having spaced side bars, scrapers suspended from said side bars beneath the forward portion of the frame and having blades diverging rearwardly, hangers secured against said side bars rearwardly from said scrapers and adjustable vertically, a shaft rotatably carried by the lower ends of said hangers, rollers fast upon said shaft behind the scrapers and tapered toward their inner ends, bearing brackets secured to said side bars and extending upwardly therefrom behind said hangers, a cam wheel between the side bars having a shaft carried by the bearing brackets, said wheel having its peripheral face formed with a track composed of extended parallel portions and diagonal portions, means to rotate the wheel shaft from the roller carrying shaft, a yoke secured to said side bars and extending transversely of the frame in front of said wheel, and a chopper back of the roller having a handle extending vertically between the side bars and pivoted in spaced relation to its upper end to the yoke for swinging transversely of the frame behind the rollers, the upper end of the handle having a finger extending rearwardly therefrom and received in the track of said wheel to control swinging of the chopper.

In testimony whereof I affix my signature.

CHARLES E. MORRIS. [L. S.]